US010266788B2

(12) United States Patent
Hiyoshi et al.

(10) Patent No.: US 10,266,788 B2
(45) Date of Patent: Apr. 23, 2019

(54) REFRIGERATING-MACHINE OIL COMPOSITION AND WORKING FLUID COMPOSITION INCLUDING SAME FOR REFRIGERATING MACHINE

(71) Applicant: KH NEOCHEM CO., LTD., Tokyo (JP)

(72) Inventors: Satoshi Hiyoshi, Tokyo (JP); Junya Kishi, Yokkaichi (JP); Masato Kujime, Ichihara (JP)

(73) Assignee: KH NEOCHEM CO., LTD., Tokyo (JP)

( * ) Notice: Subject to any disclaimer, the term of this patent is extended or adjusted under 35 U.S.C. 154(b) by 0 days.

(21) Appl. No.: 15/315,028

(22) PCT Filed: Feb. 6, 2015

(86) PCT No.: PCT/JP2015/053425
§ 371 (c)(1),
(2) Date: Nov. 30, 2016

(87) PCT Pub. No.: WO2015/182173
PCT Pub. Date: Dec. 3, 2015

(65) Prior Publication Data
US 2017/0198236 A1 Jul. 13, 2017

(30) Foreign Application Priority Data

May 30, 2014 (JP) .................................. 2014-113512
Nov. 14, 2014 (JP) .................................. 2014-232033

(51) Int. Cl.
*C09K 5/04* (2006.01)
*C10M 171/00* (2006.01)
*C10M 169/04* (2006.01)
*C10M 105/38* (2006.01)
*C10M 129/74* (2006.01)
*C10M 129/72* (2006.01)

(52) U.S. Cl.
CPC ......... *C10M 171/008* (2013.01); *C09K 5/045* (2013.01); *C10M 105/38* (2013.01); *C10M 129/72* (2013.01); *C10M 129/74* (2013.01); *C10M 169/04* (2013.01); C09K 2205/126 (2013.01); C09K 2205/22 (2013.01); C09K 2205/24 (2013.01); C10M 2207/026 (2013.01); C10M 2207/042 (2013.01); C10M 2207/282 (2013.01); C10M 2207/283 (2013.01); C10M 2207/2835 (2013.01); C10M 2223/041 (2013.01); C10N 2220/028 (2013.01); C10N 2220/302 (2013.01); C10N 2230/02 (2013.01); C10N 2230/06 (2013.01); C10N 2230/70 (2013.01); C10N 2240/30 (2013.01)

(58) Field of Classification Search
CPC .............. C09K 2205/126; C09K 5/045; C09K 2205/22; C09K 2205/104; C10M 2207/2835; C10M 171/008; C10M 105/38; C10M 105/34
See application file for complete search history.

(56) References Cited

U.S. PATENT DOCUMENTS

| 4,912,279 A | 3/1990 | Wilcher et al. |
| 5,177,282 A | 1/1993 | Nierlich et al. |
| 5,710,323 A | 1/1998 | Okuda et al. |
| 6,365,783 B1 | 4/2002 | Yokomori et al. |
| 2010/0051854 A1 | 3/2010 | Sawada et al. |
| 2012/0024007 A1 | 2/2012 | Ota et al. |
| 2013/0012420 A1* | 1/2013 | Matsumoto ............ C09K 5/045 508/569 |
| 2015/0028252 A1 | 1/2015 | Saito et al. |

FOREIGN PATENT DOCUMENTS

| CN | 101568625 A | 10/2009 |
| JP | 61004377 | 2/1986 |
| JP | 62-1930 | 1/1987 |
| JP | 63-225328 | 9/1988 |
| JP | 3-275145 | 12/1991 |
| JP | 2726138 | 12/1997 |
| JP | 3847466 | 11/2006 |
| JP | 2008239817 A | 10/2008 |
| JP | 2009074021 A | 4/2009 |
| JP | 4368454 | 9/2009 |
| JP | 2012-031239 A | 2/2012 |
| JP | 2013170255 A | 9/2013 |

(Continued)

OTHER PUBLICATIONS

Masuda et al., "Studies on Alkaline Oxidation of Alcohols", Journal of Oleo Science, Japan Oil Chemists' Society, vol. 19, No. 12, 1970, pp. 1087-1090.
Search Report and Written Opinion in International Application No. PCT/JP2015/053425 dated Apr. 7, 2015, 9 pages.
Office Action in TW Application No. 10720523400 dated Jun. 12, 2018, 5 pages.

*Primary Examiner* — John R Hardee
(74) *Attorney, Agent, or Firm* — Marshall, Gerstein & Borun LLP

(57) ABSTRACT

The present invention provides a refrigerating-machine oil composition which comprises the following ester additive (a) and the following ester base oil (b), the content of the ester additive (a) being 5-45 mass % with respect to the total amount of the refrigerating-machine oil composition. Ester additive (a): At least one ester of isotridecanoic acid with pentaerythritol Ester base oil (b): Polyhydric-alcohol esters comprising esters of two or more aliphatic monocarboxylic acids selected from among C4-9 aliphatic monocarboxylic acids with pentaerythritol.

7 Claims, No Drawings

(56) References Cited

FOREIGN PATENT DOCUMENTS

| | | |
|---|---|---|
| TW | 201202408 A | 1/2012 |
| TW | 201343902 A | 11/2013 |
| WO | WO-96/10006 A1 | 4/1996 |
| WO | WO-2013/125528 A1 | 8/2013 |

* cited by examiner

REFRIGERATING-MACHINE OIL COMPOSITION AND WORKING FLUID COMPOSITION INCLUDING SAME FOR REFRIGERATING MACHINE

TECHNICAL FIELD

The present invention relates to a refrigerating machine oil composition and a working fluid composition for refrigerating machines obtained by using the refrigerating machine oil composition.

BACKGROUND ART

Recently, in refrigerating machines and the like, hydrofluorocarbons (HFCs) having ozone depletion potentials of zero have been used as refrigerants. However, the European Union issued a directive in 2006 to ban the use of refrigerants having global warming potentials (GWPs) of more than 150 as refrigerants used for automobile air conditioning. Based on the European Union directive, the regulations for stationary air conditioners and the like using HFC refrigerants may also be revised in the future. Hence, alternative refrigerants have been studied.

Candidates for the alternative refrigerants are said to be refrigerants including hydrofluoroolefins such as 1,3,3,3-tetrafluoropropene (HFO-1234ze) and 2,3,3,3-tetrafluoropropene (HFO-1234yf) (Japanese Patent Application Publication No. 2012-31239).

However, a hydrofluoroolefin refrigerant having unsaturated bonds generate acids by oxidative decomposition. Further, the generated acid may decrease the stability of a refrigerating machine oil composition. Meanwhile, hydrofluoroolefin refrigerants have very high miscibilities with refrigerating machine oil compositions. Hence, the resulting refrigerant solutions have quite low viscosities and insufficient lubricities, which are indicated by friction, wear, or the like. Hence, a refrigerating machine oil composition used together with a hydrofluoroolefin refrigerant is required to have an excellent lubricity. Although an additive such as an extreme pressure agent or an anti-wear agent is normally added to enhance the lubricity of a refrigerating machine oil composition, the refrigerating machine oil composition is required to exhibit an excellent response to such additives (hereinafter, additive response), too.

International Publication No. WO2013/125528 discloses a refrigerating machine oil composition containing: at least one ester additive selected from tetraesters of pentaerythritol and one selected from fatty acids having 5 to 18 carbon atoms and hexaesters of dipentaerythritol and one selected from fatty acids having 5 to 18 carbon atoms; and a base oil that is an ester other than the ester additive. The content of the ester additive is 2 to 20% by mass based on a total amount of the refrigerating machine oil composition, and the kinematic viscosity of the refrigerating machine oil composition at 40° C. is 3 to 500 mm$^2$/s.

International Publication No. WO2013/125528 states that the fatty acid used in the ester additive more preferably has 6 to 9 carbon atoms, but specifically discloses only a tetraester of pentaerythritol and a fatty acid having 8 carbon atoms, and a hexaester of dipentaerythritol and a fatty acid having 6 carbon atoms.

SUMMARY OF INVENTION

An object of the present invention is to provide: a refrigerating machine oil composition having excellent properties such as lubricity, additive response, and refrigerant miscibility; and a working fluid composition for refrigerating machines obtained by using the refrigerating machine oil composition.

The present invention provides the following [1] to [3].

[1] A refrigerating machine oil composition comprising the following ester additive (a) and the following ester base oil (b), wherein a content of the ester additive (a) is within a range of 5 to 45% by mass based on a total amount of the refrigerating machine oil composition, the ester additive (a) is an ester of isotridecanoic acid and pentaerythritol, and the ester base oil (b) is an ester of a polyhydric alcohol, including esters of pentaerythritol and two or more aliphatic monocarboxylic acids selected from aliphatic monocarboxylic acids having 4 to 9 carbon atoms.

[2] A working fluid composition for refrigerating machines, consisting of:

the refrigerating machine oil composition according to [1]; and a refrigerant including a hydrofluoroolefin.

[3] The working fluid composition for refrigerating machines according to [2], wherein the refrigerant including a hydrofluoroolefin is 1,3,3,3-tetrafluoropropene (HFO-1234ze) or a refrigerant mixture of 1,3,3,3-tetrafluoropropene (HFO-1234ze) and difluoromethane (HFC-32).

The present invention makes it possible to provide: a refrigerating machine oil composition having excellent properties such as lubricity, additive response, and refrigerant miscibility; and a working fluid composition for refrigerating machines, which is obtained by using the refrigerating machine oil composition.

DESCRIPTION OF EMBODIMENTS

A refrigerating machine oil composition of the present invention is a refrigerating machine oil composition containing an ester additive (a) and an ester base oil (b), in which the content of the ester additive (a) is within a range of 5 to 45% by mass based on a total amount of the refrigerating machine oil composition.

<Ester Additive (a)>

The ester additive (a) constituting the refrigerating machine oil composition of the present invention is an ester of isotridecanoic acid and pentaerythritol. Herein, the isotridecanoic acid refers to a mixture of branched isomers of tridecanoic acid. The ester additive (a) is a complete ester in which all four hydroxyl groups of pentaerythritol constituting the ester additive (a) are esterified, but may contain a partial ester as an impurity in which some of the hydroxyl groups of pentaerythritol are not esterified and remain in the form of hydroxyl group.

The ester additive (a) has a kinematic viscosity at 40° C. of preferably within a range of 80 to 250 mm$^2$/s, more preferably within a range of 80 to 140 mm$^2$/s, and furthermore preferably within a range of 90 to 135 mm$^2$/s, from the viewpoints of retaining the refrigerating machine oil composition as an oil film, energy saving, and so forth. In this respect, the kinematic viscosity can be measured according to the method of JIS K2283:2000 using a Cannon-Fenske viscometer.

The number of terminal methyl groups per isotridecanoic acid molecule in the isotridecanoic acid constituting the ester additive (a) is preferably within a range of 2.0 to 5.0 on average, more preferably within a range of 2.6 to 3.4 on average, and furthermore preferably within a range of 2.7 to 3.2 on average, from the viewpoints that the refrigerating machine oil composition of the present invention has a low-temperature fluidity, an oxidation stability, a low volatility, and so forth.

The number of terminal methyl groups per isotridecanoic acid molecule in the isotridecanoic acid constituting the ester additive (a) is obtained as an average value according to the following formula 1 using the $^1$H-NMR measurement result of the isotridecanoic acid. The $^1$H-NMR measurement method is conducted as described in the section of Examples.

The number of terminal methyl groups per isotridecanoic acid molecule=(a sum of integrated values of peaks assigned to hydrogens of the methyl groups/a sum of integrated values of peaks assigned to hydrogens of a hydrocarbon group)×25/3 (formula 1)

Here, the peaks assigned to hydrogens of the methyl groups refer to peaks which appear in a range from 0.5 ppm to a chemical shift (ppm) at a minimum value of peaks which appear within a range of 0.9 to 1.1 ppm. The degree of branching of the hydrocarbon group can be grasped from the number of terminal methyl groups obtained by the formula 1.

In the present invention, the term low volatility refers to an effect of suppressing the evaporation loss (evaporation) of the lubricant in a high-temperature range. Since a refrigerating machine oil composition is used at high temperature in a refrigerant compressor, if a refrigerating machine oil composition poor in low volatility is used, the refrigerating machine oil composition evaporates, so that oil shortage occurs or the oil runs out at a lubrication portion, also resulting in seizure in some cases. For these reasons, a refrigerating machine oil composition is required to have a low volatility.

The isotridecanoic acid constituting the ester of the present invention can be synthesized, for example, by the following methods (i) to (iv):

(i) a method in which tridecanal is isolated by distillation from a mixture of tridecanal and tridecanol obtained by hydroformylating a mixture of branched isomers of dodecene, and the distillate is oxidized by a known method such as oxidation with oxygen;

(ii) a method in which a mixture of tridecanal and tridecanol obtained by hydroformylating a mixture of branched isomers of dodecene is oxidized by a known method such as oxidation with oxygen, and tridecanoic acid thus formed is isolated by distillation;

(iii) a method in which a mixture of tridecanal and tridecanol obtained by hydroformylating a mixture of branched isomers of dodecene is hydrogenated to convert tridecanal in the mixture into tridecanol, and obtained tridecanol is oxidized; and (iv) a method in which a mixture of branched isomers of dodecene is subjected to the Koch reaction.

The method for hydroformylating a mixture of branched isomers of dodecene described in the methods (i) to (iii) includes a method in which a mixture of branched isomers of dodecene is reacted in the presence of a cobalt catalyst or a rhodium catalyst and a gas mixture of hydrogen and carbon monoxide. Moreover, an example of the method for oxidizing tridecanol described in the method (iii) include a method in which tridecanol is oxidized in the presence of an alkali according to the method described in "Journal of Oleo Science," issued by the Japan Oil Chemists' Society, 1970, Vol. 19, No. 20, pp. 1087 to 1090, or the like.

The method for hydroformylating a mixture of branched isomers of dodecene in the presence of a cobalt catalyst includes a method in which a mixture of branched isomers of dodecene is hydroformylated in a single stage or multiple stages in the presence of a cobalt catalyst and a gas mixture of hydrogen and carbon monoxide according to a known method, for example, the method described in Japanese Examined Patent Application Publication No. Sho 62-1930, Japanese Patent No. 4368454, or the like.

As the conditions of the hydroformylation, for example, the reaction pressure is 5 to 35 MPa, preferably 10 to 30 MPa; the reaction temperature is 120 to 200° C., preferably 140 to 170° C.; and the ratio of hydrogen and carbon monoxide in the gas mixture (hydrogen/carbon monoxide: molar ratio) is 0.8 to 2.0, preferably 1.0 to 1.6. Examples of the cobalt catalyst include cobalt carbonyl complexes such as octacarbonyldicobalt, organic acid salts of cobalt such as cobalt acetate, cobalt hydroxides, cobalt oxides, and the like. Treating these cobalt catalysts with a gas mixture of hydrogen and carbon monoxide forms hydridotetracarbonylcobalt which is presumably the active species of the hydroformylation.

The method for hydroformylating a mixture of branched isomers of dodecene in the presence of a rhodium catalyst includes a method in which a mixture of branched isomers of dodecene is hydroformylated in a single stage or multiple stages in the presence of a rhodium catalyst and a gas mixture of hydrogen and carbon monoxide according to a known method, for example, the method described in Japanese Patent Application Publication No. Sho 63-225328, Japanese Patent No. 3847466, or the like.

As the conditions of the hydroformylation, for example, the reaction pressure is 0.5 to 20 MPa, preferably 0.5 to 10 MPa; the reaction temperature is 50 to 170° C., preferably 90 to 150° C.; and the ratio of hydrogen and carbon monoxide in the gas mixture (hydrogen/carbon monoxide:molar ratio) is 0.8 to 2.0, preferably 1.0 to 1.6. Examples of the rhodium catalyst include rhodium carbonyl complexes such as carbonylhydridotris(triphenylphosphine)rhodium and (acetylacetonato)dicarbonylrhodium, organic acid salts of rhodium such as rhodium acetate, inorganic acid salts of rhodium such as rhodium nitrate, rhodium oxides, and the like. Treating these rhodium catalysts with a gas mixture of hydrogen and carbon monoxide forms the active species of the hydroformylation. Additionally, it is also possible to advantageously use catalysts obtained by adding a phosphine ligand, a phosphite ligand, or the like to these rhodium catalysts.

The Koch reaction described in the method (iv) includes a method in which a mixture of branched isomers of dodecene is reacted in the presence of a catalyst such as sulfuric acid, phosphoric acid, hydrogen fluoride, or boron trifluoride, carbon monoxide, and water according to a known method, for example, the method described in Japanese Examined Patent Application Publication No. Sho 61-4377, International Publication No. WO96/10006, or the like. As the reaction conditions, for example, the partial pressure of carbon monoxide is 0.1 to 10 MPa, preferably 0.2 to 5 MPa, and the reaction temperature is −40 to 80° C., preferably −20 to 60° C.

Examples of the mixture of branched isomers of dodecene include butene trimers, isobutene trimers, propylene tetramers, mixtures thereof, and the like. Nevertheless, the mixture of branched isomers of dodecene preferably contains a butene trimer or a butene trimer as a main component from the viewpoints that the refrigerating machine oil composition of the present invention has a low-temperature fluidity, an oxidation stability, a low volatility, and so forth. In this respect, the term butene refers to a mixture of 1-butene, 2-butene, and isobutene. The isobutene content in the mixture is preferably less than 30% by mass, and more preferably less than 10% by mass, from the viewpoints that the refrigerating machine oil composition of the present invention has a low-temperature fluidity, an oxidation stability, a low volatility, and so forth. Moreover, the butene trimer preferably has an initial boiling point within a range of 185 to 195° C., and preferably has a dry point within a range of 195 to 215° C. In a case where the mixture of branched isomers of dodecene is not a mixture of branched isomers of dodecene containing a butene trimer or a butene trimer as a main component (for example, in a case of a propylene tetramer), an ester of pentaerythritol and isotridecanoic acid derived from the mixture of branched isomers of dodecene through the hydroformylation method tends to have a kinematic viscosity at 40° C. outside the range of 80 to 140 mm$^2$/s.

The mixture of branched isomers of dodecene can be synthesized by a known method, for example, an oligomer of butene, isobutene, or propylene is formed in the presence of a homogeneous catalyst or a heterogeneous catalyst, and then purified by distillation to obtain an olefin distillate having 12 carbon atoms.

Examples of the homogeneous catalyst include solubilized nickel complexes and the like. Specific examples of the solubilized nickel complexes include catalysts containing a nickel carboxylate, an alkyl aluminum halide, and an alkylene glycol described in Japanese Examined Patent Application Publication No. Sho 61-26888 or the like, and other similar catalysts. Examples of the heterogeneous catalyst include a fixed bed catalyst containing nickel described in Japanese Patent No. 2726138 or the like, a solid phosphoric acid catalyst described in Japanese Patent Application Publication No. Hei 3-275145 or the like, and other similar catalysts.

The number of terminal methyl groups per isotridecanoic acid molecule is influenced by, for example, the number of terminal methyl groups per molecule in the mixture of branched isomers of dodecene, which serves as the raw material, but can also be adjusted depending on the above-described different methods for producing the isotridecanoic acid, as well as the type of the catalyst, the rate of the reaction, the distillation condition, and the like in each production method.

The method for producing the isotridecanoic acid constituting the ester of the present invention is preferably the methods (i) to (iii) from the viewpoints that the refrigerating machine oil composition of the present invention has a low-temperature fluidity, an oxidation stability, a low volatility, and so forth. As the catalyst used in these methods hydroformylation, both the cobalt catalyst and the rhodium catalyst can be advantageously used.

The ester additive (a) can be synthesized, for example, by reacting the isotridecanoic acid and pentaerythritol at 120 to 300° C. for 5 to 40 hours.

A catalyst may be used in the reaction. Examples of the catalyst include mineral acids, organic acids, Lewis acids, organometals, solid acids, and the like. Specific examples of the mineral acids include hydrochloric acid, hydrofluoric acid, sulfuric acid, phosphoric acid, nitric acid, and the like. Specific examples of the organic acids include p-toluenesulfonic acid, benzenesulfonic acid, butanesulfonic acid, propanesulfonic acid, ethanesulfonic acid, methanesulfonic acid, and the like. Specific examples of the Lewis acids include boron trifluoride, aluminum chloride, tin tetrachloride, titanium tetrachloride, and the like. Specific examples of the organometals include tetrapropoxytitanium, tetrabutoxytitanium, tetrakis(2-ethylhexyloxy)titanium, and the like. Specific examples of the solid acids include cation-exchange resins and the like.

It is preferable to carry out the reaction while removing water formed by the reaction from the reaction mixture. The amount of the isotridecanoic acid used is preferably 1.1 to 1.4 times larger in terms of moles than the hydroxyl groups of pentaerythritol used.

A solvent may be used in the reaction. Examples of the solvent include hydrocarbon-based solvents such as benzene, toluene, xylene, hexane, heptane, isohexane, isooctane, isononane, and decane, and other similar solvents.

In the reaction, unreacted isotridecanoic acid and solvent may be recovered and recycled. In the productions of the ester additive (a) and the isotridecanoic acid, a product obtained in each stage may be purified as necessary by a method normally used in synthetic organic chemistry (such as washing with water and/or an alkaline aqueous solution, treatment with activated carbon, an adsorbent, or the like, various chromatographic methods, distillation).

The ester additive (a) exhibits excellent properties such as lubricity and additive response, when added to the ester base oil (b).

<Ester Base Oil (b)>

The ester base oil (b) constituting the refrigerating machine oil composition of the present invention is an ester of a polyhydric alcohol, including esters of pentaerythritol and two or more aliphatic monocarboxylic acids selected from aliphatic monocarboxylic acids having 4 to 9 carbon atoms. Herein, the polyhydric alcohol includes pentaerythritol, neopentyl glycol, 2-butyl-2-ethyl-1,3-propanediol, 3-hydroxy-2,2-dimethylpropyl-3-hydroxy-2,2-dimethylpropanoate, trimethylolethane, trimethylolpropane, dipentaerythritol, ditrimethylolpropane, and the like.

The content of the ester base oil (b) is preferably within a range of 55 to 93% by mass based on the total amount of the refrigerating machine oil composition of the present invention.

The ester base oil (b) may be an ester of pentaerythritol and two or more aliphatic monocarboxylic acids selected from aliphatic monocarboxylic acids having 4 to 9 carbon atoms, or may be an ester further containing an additional ester of the polyhydric alcohol. This additional ester of the polyhydric alcohol is used in combination so as to prepare a refrigerating machine oil composition having an optimal viscosity and an optimal two-phase separation temperature with a refrigerant (refrigerant miscibility) from the viewpoints of retaining the oil film, energy saving, and so forth. The content of the additional ester of the polyhydric alcohol is preferably 25% by mass or less based on the total amount of the refrigerating machine oil composition.

Examples of the additional ester of the polyhydric alcohol include esters of neopentyl glycol and one or more aliphatic monocarboxylic acids selected from aliphatic monocarboxylic acids having 4 to 13 carbon atoms, esters of dipentaerythritol and two or more aliphatic monocarboxylic acids selected from aliphatic monocarboxylic acids having 4 to 9 carbon atoms, and the like.

Examples of the aliphatic monocarboxylic acids having 4 to 9 carbon atoms in the ester base oil (b) include linear aliphatic monocarboxylic acids such as butyric acid, pentanoic acid, hexanoic acid, heptanoic acid, octanoic acid, and nonanoic acid; branched aliphatic monocarboxylic acids such as isobutyric acid, 2-methylbutyric acid, 3-methylbutyric acid, 2,2-dimethylpropanoic acid, 2-ethylbutyric acid, 2-methylpentanoic acid, 4-methylpentanoic acid, 2-methylhexanoic acid, 2-ethylpentanoic acid, 2-ethyl-2-methylbutyric acid, 2,2-dimethylpentanoic acid, 2-methylheptanoic acid, 2-ethylhexanoic acid, 3-ethylhexanoic acid, 2-ethyl-2-methylpentanoic acid, 2-ethyl-4-methylpentanoic acid, 3,5,5-trimethylhexanoic acid, and 2,2-dimethylheptanoic acid, and the like. Among these, butyric acid, pentanoic acid, heptanoic acid, isobutyric acid, 2-methylbutyric acid, 2-ethylhexanoic acid, or 3,5,5-trimethylhexanoic acid is preferable because of the availability.

Examples of the aliphatic monocarboxylic acids having 4 to 13 carbon atoms in the ester base oil (b) include ones exemplified as the aliphatic monocarboxylic acids having 4 to 9 carbon atoms, isotridecanoic acid, and the like. Among these, ones exemplified above as preferable aliphatic monocarboxylic acids having 4 to 9 carbon atoms or isotridecanoic acid are preferable because of the availability.

Specific examples of the esters of pentaerythritol and two or more aliphatic monocarboxylic acids selected from aliphatic monocarboxylic acids having 4 to 9 carbon atoms (hereinafter referred to as ester b-PE) include an ester of isobutyric acid, 3,5,5-trimethylhexanoic acid, and pentaerythritol; an ester of isobutyric acid, 2-ethylhexanoic acid, and pentaerythritol; an ester of pentanoic acid, 3,5,5-trimethylhexanoic acid, and pentaerythritol; an ester of pentanoic acid, heptanoic acid, 3,5,5-trimethylhexanoic acid, and pentaerythritol; an ester of 2-methylbutyric acid, 3,5,5-trimethylhexanoic acid, and pentaerythritol; an ester of 2-methylbutyric acid, 2-ethylhexanoic acid, and pentaerythritol; an ester of 2-ethylhexanoic acid, 3,5,5-trimethylhexanoic acid, and pentaerythritol; or mixtures of these esters; mixtures of two or more of these esters in each of which the constituent carboxylic acids are the same and only the composition ratio is different; and the like. Among these, preferable is: an ester of isobutyric acid, 3,5,5-trimethylhexanoic acid, and pentaerythritol; an ester of pentanoic acid, 3,5,5-trimethylhexanoic acid, and pentaerythritol; an ester of pentanoic acid, heptanoic acid, 3,5,5-trimethylhexanoic acid, and pentaerythritol; an ester of 2-ethylhexanoic acid, 3,5,5-trimethylhexanoic acid, and pentaerythritol; or mixtures of two or more of these esters in each of which the constituent carboxylic acids are the same and only the composition ratio is different.

Specific examples of the esters of neopentyl glycol and one or more aliphatic monocarboxylic acids selected from aliphatic monocarboxylic acids having 4 to 13 carbon atoms (hereinafter referred to as ester b-NPG) include an ester of isobutyric acid, 3,5,5-trimethylhexanoic acid, and neopentyl glycol; an ester of isobutyric acid, 2-ethylhexanoic acid, and neopentyl glycol; an ester of 2-ethylhexanoic acid and neopentyl glycol; an ester of 3,5,5-trimethylhexanoic acid and neopentyl glycol; an ester of isotridecanoic acid and neopentyl glycol; and the like. Among these, preferable is an ester of 2-ethylhexanoic acid and neopentyl glycol, or an ester of isotridecanoic acid and neopentyl glycol.

Specific examples of the esters of dipentaerythritol and two or more aliphatic monocarboxylic acids selected from aliphatic monocarboxylic acids having 4 to 9 carbon atoms (hereinafter referred to as ester b-DPE) include an ester of isobutyric acid, 3,5,5-trimethylhexanoic acid, and dipentaerythritol; an ester of isobutyric acid, 2-ethylhexanoic acid, and dipentaerythritol; an ester of pentanoic acid, 3,5,5-trimethylhexanoic acid, and dipentaerythritol; an ester of pentanoic acid, heptanoic acid, 3,5,5-trimethylhexanoic acid, and dipentaerythritol; an ester of 2-methylbutyric acid, 3,5,5-trimethylhexanoic acid, and dipentaerythritol; an ester of 2-methylbutyric acid, 2-ethylhexanoic acid, and dipentaerythritol; and an ester of 2-ethylhexanoic acid, 3,5,5-trimethylhexanoic acid, and dipentaerythritol. Among these, preferable is an ester of isobutyric acid, 3,5,5-trimethylhexanoic acid, and dipentaerythritol; an ester of pentanoic acid, 3,5,5-trimethylhexanoic acid, and dipentaerythritol; an ester of pentanoic acid, heptanoic acid, 3,5,5-trimethylhexanoic acid, and dipentaerythritol; or an ester of 2-ethylhexanoic acid, 3,5,5-trimethylhexanoic acid, and dipentaerythritol.

The ester base oil (b) is preferably the esters preferable as the ester b-PE, a mixture of the esters preferable as the ester b-PE and the esters preferable as the b-NPG, or a mixture of the esters preferable as the ester b-PE and the esters preferable as the b-DPE. The ester base oil (b) is more preferably the esters preferable as the ester b-PE, or a mixture of the esters preferable as the ester b-PE and the esters preferable as the b-NPG.

The ester base oil (b) is a complete ester in which all the hydroxyl groups of the polyhydric alcohol are esterified, but may contain a partial ester as an impurity in which some of the hydroxyl groups of the polyhydric alcohol are not esterified and remain in the form of hydroxyl group.

In the case where the ester base oil (b) is an ester b-PE, the ester base oil (b) can be synthesized, for example, by reacting the aliphatic monocarboxylic acid having 4 to 9 carbon atoms and pentaerythritol at 120 to 300° C. for 5 to 40 hours. It is preferable to carry out the reaction while removing water formed by the reaction from the reaction mixture.

In the reaction, the amount of the aliphatic monocarboxylic acid having 4 to 9 carbon atoms used is preferably 1.1 to 1.4 times larger in terms of moles than the hydroxyl groups of pentaerythritol used. A catalyst and a solvent may be used in the reaction, and specifically include catalysts and solvents exemplified in the method for producing the ester additive (a). The reaction may be followed by purification, as necessary, by a method normally used in synthetic organic chemistry (such as washing with water and/or an alkaline aqueous solution, treatment with activated carbon, an adsorbent, or the like, various chromatographic methods, distillation).

In the case where the ester base oil (b) is, for example, a mixture of the ester b-PE and the ester b-NPG, or a mixture of the ester b-PE and the ester b-DPE, the ester base oil (b) can be obtained by independently producing the ester b-PE and the ester b-NPG or the ester b-DPE according to the above-described reaction method, except that the corresponding raw materials are changed, and then mixing the products together. Further, in a case where all the carboxylic acids constituting the ester b-PE are the same as the carboxylic acid(s) constituting the ester b-NPG or the ester b-DPE, the raw materials used to produce the ester b-PE and the ester b-NPG or the ester b-DPE may be put together for the simultaneous productions according to the above-described reaction method to obtain the ester base oil (b).

<Refrigerating Machine Oil Composition>

The refrigerating machine oil composition of the present invention is a refrigerating machine oil composition containing the ester additive (a) and the ester base oil (b), in which the content of the ester additive (a) is within the range of 5 to 45% by mass based on the total amount of the refrigerating machine oil composition. If the proportion of the ester additive (a) is less than 5% by mass, the refrigerating machine oil composition of the present invention is poor in lubricity and additive response. On the other hand, if the ratio is more than 45% by mass, the refrigerating machine oil composition of the present invention is poor in refrigerant miscibility. Particularly, in a case where a refrigerant is a refrigerant mixture of a hydrofluoroolefin and a hydrofluorocarbon, a range of 5 to 30% by mass is preferable from the viewpoint of refrigerant miscibility.

The refrigerating machine oil composition of the present invention may contain, as necessary, a lubricant base oil other than the ester base oil (b), and a lubricant additive other than the ester additive (a). In this case, a total amount of the ester additive (a) and the ester base oil (b) in the refrigerating machine oil composition is preferably within a range of 70 to 99% by mass, and more preferably within a range of 95 to 99% by mass, based on the total amount of the refrigerating machine oil composition.

Examples of the lubricant base oil other than the ester base oil (b) include a mineral oil, a synthetic base oil, and the like. Examples of the mineral oil include paraffin-base crude oils, intermediate-base crude oils, and naphthenic-base crude oils. In addition, refined oils obtained by refining these oils by distillation or the like can also be used. Examples of the synthetic base oil include poly-α-olefins (such as polybutene, polypropylene, α-olefin oligomers having 8 to 14 carbon atoms), aliphatic esters other than the ester base oil (b) (such as fatty acid monoesters, aliphatic polybasic acid esters), aromatic esters (aromatic monoesters, aromatic esters of polyhydric alcohols, aromatic polybasic acid esters), polyalkylene glycols, polyvinyl ethers, polycarbonates, alkyl benzenes, and the like. Examples of the aliphatic esters other than the ester base oil (b) include an ester of 1,2-cyclohexanedicarboxylic acid and 2-ethylhexanol, an ester of sebacic acid and 2-ethylhexanol, and the like.

The refrigerating machine oil composition of the present invention may contain the lubricant base oil other than the ester base oil (b) in a range without impairing the refrigerant miscibility in the presence of a refrigerant, lubricity, additive response, and so forth. Nevertheless, the content of the lubricant base oil other than the ester base oil (b) is preferably 30% by mass or less, more preferably 20% by mass or less, and the most preferably 10% by mass or less, based on the total amount of the refrigerating machine oil composition.

Examples of the lubricant additive other than the ester additive (a) (hereinafter referred to as lubricant additive) include an antioxidant, a wear reducing agent (anti-wear agent, anti-seizure agent, extreme pressure agent, and the like), a friction modifier, an oiliness agent, an acid scavenger, a metal deactivator, a rust preventive agent, a defoamer, and the like. The content of each of these lubricant additives is preferably 0.001 to 5% by mass based on the total amount of the refrigerating machine oil composition.

Examples of the antioxidant include phenol-based antioxidants such as 2,6-di-tert-butyl-4-methylphenol, 2,6-di-tert-butyl-4-ethylphenol, and 4,4'-methylenebis(2,6-di-tert-butylphenol); amine-based antioxidants such as phenyl-α-naphthylamine and N,N'-di-phenyl-p-phenylenediamine; and the like.

Examples of the wear reducing agent include phosphorus-based extreme pressure agents such as phosphoric acid esters, thiophosphoric acid esters, acidic phosphoric acid esters, phosphorus acid esters, and amine salts of acidic phosphoric acid esters, and the like. Here, as the phosphoric acid esters, tricresyl phosphate is preferably used. Moreover, as the amine salts of acidic phosphoric acid esters, commercially available products under product names of, for example, Lubdyne 3000 (manufactured by SC Organic Chemical Co., Ltd.), IRGALUBE 349 (manufactured by Ciba Specialty Chemicals), and so on are preferably used.

Examples of the acid scavenger include epoxy-based acid scavengers such as glycidyl ethers and glycidyl esters, and the like. Examples of the glycidyl ethers include 2-ethylhexyl glycidyl ether and the like. Examples of the glycidyl esters include neodecanoic acid glycidyl ester and the like.

Examples of the metal deactivator include benzotriazole, 2,5-dialkylmercapto-1,3,4-thiadiazole, and the like. Among these, benzotriazole is preferable.

Examples of the defoamer include dimethylsiloxane and the like.

The refrigerating machine oil composition of the present invention has excellent properties such as lubricity, additive response, and refrigerant miscibility, as well as sufficient properties such as low-temperature fluidity and sealant compatibility, which are required for refrigerating machine oil compositions and working fluid compositions for refrigerating machines. Herein, the term lubricity refers to both a lubricity in the presence of a refrigerant and a lubricity in the absence of a refrigerant. Meanwhile, since containing the ester additive (a), the refrigerating machine oil composition of the present invention is capable of maintaining a high viscosity of a refrigerant solution while having an excellent refrigerant miscibility.

Examples of the lubricity include friction-reducing properties, wear-reducing properties (anti-wear properties), extreme pressure properties, and the like. The lubricity can be evaluated with friction and wear testing machines such as a shell four-ball friction tester with reference to ASTM D4172, ASTM D2783, and so forth. A lubricant having a high lubricity is preferable in view of energy saving, extending an apparatus lifetime, and so forth attributable to reductions in the friction resistance between machine elements and in the wear loss of a sliding member. When a lubricant is used as a refrigerating machine oil, the lubricant is required to have not only a lubricity in the absence of a refrigerant but also a lubricity in the presence of a refrigerant. The lubricity in the presence of a refrigerant can be evaluated with friction and wear testing machines such as a block-on-ring friction and wear testing machine (manufactured by FALEX Corporation) of a sealed pressurization type according to ASTM D2714, and a Pin & Vee Block friction and wear testing machine (manufactured by FALEX Corporation) of a sealed pressurization type according to ASTM D2670.

The response to an additive is also expressed by "Additive Response" or the like. This means an adding effect exhibited when an additive such as an antioxidant or a wear reducing agent is added to a refrigerating machine oil composition. The effect of adding an additive differs among refrigerating machine oil compositions, and it can be said that the larger the adding effect by addition, that is, the enhancement of physical properties, the more favorable the additive response.

The term refrigerant miscibility refers to a miscibility of a refrigerating machine oil composition with a refrigerant. If the refrigerant miscibility is poor, the refrigerant and the refrigerating machine oil composition are phase-separated, and the refrigerating machine oil composition discharged from a refrigerant compressor builds up in a refrigerant circulation cycle, which may possibly result in problems of a lubrication failure and the like in the refrigerant compressor. The refrigerant miscibility is generally indicated by using two-phase separation temperature. The two-phase separation temperature can be measured according to the method of JIS K2211:2009. It can be said that the lower the two-phase separation temperature, the more favorable the refrigerant miscibility at lower temperature.

On the other hand, if the refrigerant miscibility of a refrigerating machine oil composition is too high, this decreases the refrigerant-solution viscosity of a working fluid composition for refrigerating machines at a position where a large amount of a refrigerant dissolves inside a refrigerant compressor in which the temperature and pressure change greatly. Such a decrease in the refrigerant-solution viscosity makes it difficult to retain the oil film necessary for the lubrication, and may possibly result in problems of a lubrication failure such as seizure and increased wear amount. For these reasons, a refrigerating machine oil composition is required to have a high refrigerant-solution viscosity, too. The refrigerant-solution viscosity can be measured, for example, by sealing a refrigerant and a refrigerating machine oil composition in a pressure-resistant vessel, stabilizing the pressure of a gas phase portion and the temperature in the vessel in predetermined states, and then measuring the viscosity of a liquid phase portion by using an in-line viscometer or the like.

The term sealant compatibility refers to a compatibility between a refrigerating machine oil composition and a sealant. The sealant includes O-rings made of a material such as an acrylonitrile-butadiene rubber, an ethylene-propylene-diene rubber, a hydrogenated acrylonitrile-butadiene rubber, a silicone rubber, or a fluororubber, and the like. In a refrigerant compressor of a refrigerating machine, a refrigerating machine oil composition and a refrigerant are hermetically sealed with such a sealant. However, if a refrigerating machine oil composition has a poor sealant compatibility, the sealant is swollen or shrunken, bringing about problems such as refrigerant leakage and oil leakage. Moreover, if a slightly flammable refrigerant such as, for example, a hydrofluoroolefin is used as the refrigerant, the refrigerant leakage may possibly cause a fire. Hence, a refrigerating machine oil composition excellent in sealant compatibility is required.

The term low-temperature fluidity refers to a viscosity characteristic in a low-temperature range, and is indicated by pour point, freezing point, channel point, or the like. The refrigerating machine oil composition of the present invention preferably has a pour point of −40° C. or less. A refrigerating machine oil composition having a low pour point is preferable in that, for example, an operation failure does not occur in an apparatus using the refrigerating machine oil composition because the fluidity does not deteriorate even in winter or low temperature environments such as a cold region. Note that, in the present invention, a pour point means a pour point measured according to the method of JIS K2269.

The refrigerating machine oil composition of the present invention preferably has a kinematic viscosity at 40° C. of 20 to 100 mm$^2$/s from the viewpoints of retaining the oil film, energy saving, and so forth. Meanwhile, the viscosity index of the refrigerating machine oil composition of the present invention is not particularly limited, but is preferably 80 or more from the viewpoints of retaining the oil film, energy saving, and so forth. Herein, the term viscosity index refers to a viscosity-temperature characteristic, and it can be said that the higher the viscosity index, the more favorable the viscosity-temperature characteristic. The kinematic viscosity and the viscosity index can be measured according to the method of JIS K2283:2000 using a Cannon-Fenske viscometer.

<Working Fluid Composition for Refrigerating Machines>

A working fluid composition for refrigerating machines of the present invention consists of the refrigerating machine oil composition of the present invention and a refrigerant including a hydrofluoroolefin. The refrigerating machine oil composition of the present invention normally exists in the form of working fluid composition for refrigerating machines which is mixed with a refrigerant in a refrigerant circulation cycle of a refrigerating machine or the like. The mixing ratio of the refrigerating machine oil composition and the refrigerant in the fluid composition is not particularly limited. Nevertheless, the amount of the refrigerating machine oil composition of the present invention is preferably 1 to 1000 parts by mass, and more preferably 2 to 800 parts by mass, relative to 100 parts by mass of the refrigerant.

In the working fluid composition for refrigerating machines of the present invention, the refrigerating machine oil composition of the present invention and the refrigerant including a hydrofluoroolefin are preferably not separated into two phases at 0° C. and hence are mixed in a miscible manner. The refrigerant including a hydrofluoroolefin has a global warming potential (GWP) of preferably 500 or less, and more preferably 300 or less. The refrigerant including a hydrofluoroolefin includes hydrofluoroolefins or refrigerant mixtures of hydrofluoroolefins and other refrigerants.

The hydrofluoroolefins specifically include 1,3,3,3-tetrafluoropropene (HFO-1234ze), 2,3,3,3-tetrafluoropropene (HFO-1234yf), 1,2,3,3,3-pentafluoropropene (HFO-1225ye), 1,1,2-trifluoroethylene (HFO-1123), and the like. Among these, 1,3,3,3-tetrafluoropropene (HFO-1234ze) is preferable from the viewpoint of chemical stability.

The other refrigerants specifically include hydrofluorocarbon refrigerants such as difluoromethane (HFC-32), pentafluoroethane (HFC-125), 1,1,1,2-tetrafluoroethane (HFC-134a), 1,1-difluoroethane (HFC-152a), and monofluoroethane (HFC-161); hydrocarbon refrigerants such as propane (R290), butane (R600), and isobutane (R600a); a carbon dioxide refrigerant (R744); an ammonia refrigerant (R717); and the like. Among these, difluoromethane (HFC-32), 1,1-difluoroethane (HFC-152a), propane (R290), and carbon dioxide (R744) are preferable.

Specifically, the refrigerant mixtures of hydrofluoroolefins and the other refrigerants are preferably a refrigerant mixture of 1,3,3,3-tetrafluoropropene (HFO-1234ze) and difluoromethane (HFC-32); a refrigerant mixture of 1,3,3,3-tetrafluoropropene (HFO-1234ze), 2,3,3,3-tetrafluoropropene (HFO-1234yf), and difluoromethane (HFC-32); a refrigerant mixture of 1,3,3,3-tetrafluoropropene (HFO-1234ze), difluoromethane (HFC-32), and 1,1-difluoroethane (HFC-152a); a refrigerant mixture of 1,3,3,3-tetrafluoropropene (HFO-1234ze) and propane (R290); or a refrigerant mixture of 1,3,3,3-tetrafluoropropene (HFO-1234ze) and carbon dioxide (R744). A refrigerant mixture of 1,3,3,3-tetrafluoropropene (HFO-1234ze) and difluoromethane (HFC-32) is more preferable.

The refrigerating machine oil composition and the working fluid composition for refrigerating machines of the present invention are preferably used in, for example, room air conditioners, package air conditioners, automobile air conditioners, dehumidifiers, refrigerators, freezers, refrigerator-freezers, vending machines, showcases, and refrigerating machines in chemical plants and the like.

EXAMPLES

Hereinafter, the present invention will be described more specifically by way of Production Examples, Examples, and Comparative Examples. However, the present invention is not limited to Examples below.

Note that the number of terminal methyl groups in each isotridecanoic acid of Production Examples 1 and 2, the molar ratios of carboxylic acids constituting ester base oils (b) of Production Examples 6 to 12, and the molar ratio of a polyhydric alcohol constituting an ester base oil (b)-7 of Production Example 12 were determined by $^1$H-NMR described below.

[$^1$H-NMR]
<Measurement Instrument>
JNM-ECA500 (500 MHz) manufactured by JEOL Ltd.
<Measurement Conditions>
Standard substance; tetramethylsilane (TMS)
Solvent; CDCl3
Sample concentration; 40% by mass
Number of scans; 64
Chemical shift reference; TMS=0 ppm Production Example 1

[Production of Isotridecanoic Acid A]

Butene (a mixture of 1-butene, 2-butene, and isobutene; provided that the isobutene content was less than 10% by mass of the whole) was reacted at 200° C. at 5 MPa using a solid phosphoric acid catalyst with diatomaceous earth as a support. Then, the product was purified by distillation. Thereby, a butene trimer (initial boiling point: 192° C., dry point: 202° C.) was obtained. The obtained butene trimer was hydroformylated under conditions of a pressure at 16 MPa and a temperature at 150° C. in the presence of a gas mixture of hydrogen and carbon monoxide (hydrogen/carbon monoxide mixing ratio (molar ratio); 1.1/1) using, as a catalyst, hydridotetracarbonylcobalt having been formed by treating cobalt hydroxide with a gas mixture of hydrogen and carbon monoxide. After the catalyst was removed, the resultant was oxidized and subsequently purified by distillation (recovered temperature: 165 to 175° C., reduced pressure: 5 Torr). Thus, isotridecanoic acid A was obtained. As a result of the $^1$H-NMR measurement, the number of terminal methyl groups contained in one molecule of the isotridecanoic acid A was 2.9.

Production Example 2

[Production of Isotridecanoic Acid B]

Propylene was reacted at 200° C. at 5 MPa using a solid phosphoric acid catalyst with diatomaceous earth as a support. Then, the product was purified by distillation. Thereby, a propylene tetramer was obtained. The obtained propylene tetramer was subjected to hydroformylation, catalyst removal, oxidization, and distillation purification (recovered temperature: 154 to 169° C., reduced pressure: 5 Torr) by the same processes as in Production Example 1. Thus, isotridecanoic acid B was obtained. As a result of the $^1$H-NMR measurement, the number of terminal methyl groups contained in one molecule of the isotridecanoic acid B was 3.9.

Production Example 3

[Production of Ester of Isotridecanoic Acid A and Pentaerythritol (Ester Additive (a)-1)]

Into a reactor equipped with a Dean-Stark trap, 458 g of pentaerythritol (3.4 mol, manufactured by Koei Perstorp Co., Ltd., product name: Pentarit-S) and 3447 g (16.1 mol) of the isotridecanoic acid A were introduced and mixed together. While the mixture was being stirred, the pressure was reduced to 80 kPa. Then, the pressure was returned to atmospheric pressure with nitrogen. This operation was performed three times. Thereby, the air inside the reactor was replaced with nitrogen.

Subsequently, the mixture was stirred at 172 to 232° C. for 23 hours under atmospheric pressure with nitrogen bubbling. After the reaction, the reaction product was stirred under a reduced pressure of 0.4 kPa at 216 to 230° C. for 3 hours. Thereby, the unreacted carboxylic acid in the reaction product was distilled off. The reaction product was washed at 80° C. for 1 hour with 1025 mL of an alkaline aqueous solution containing sodium hydroxide in an amount 2 times larger in terms of moles than the acid number of the reaction product. Thereafter, the reaction product was washed with 1000 mL of water at 90° C. for 1 hour three times. After that, the reaction product was stirred with nitrogen bubbling under a reduced pressure of 0.6 kPa at 100° C. for 2 hours to dry the reaction product.

To the reaction product, 30 g of an adsorbent (manufactured by Kyowa Chemical Industry Co., Ltd., product name; KYOWAAD 500) and 30 g of activated carbon (manufactured by Japan EnviroChemicals, Limited, product name; SHIRASAGI P) were added. With nitrogen bubbling, the reaction product was stirred under a reduced pressure of 0.6 kPa at 100° C. for 1 hour. Then, the reaction product was filtered in a nitrogen atmosphere by using a filter aid (manufactured by Showa Chemical Industry Co., LTD., product name; RADIOLITE #500) having been dried under reduced pressure in advance. Thus, 2894 g of an ester additive (a)-1 was obtained.

Production Example 4

[Production of Ester of Isotridecanoic Acid B and Pentaerythritol (Ester Additive (a)-2)]

An ester additive (a)-2 was obtained by conducting the same manner as in Production Example 3, except that the isotridecanoic acid B was used instead of the isotridecanoic acid A, and that the molar ratio between the amounts of pentaerythritol and the isotridecanoic acid B used was set to 1/4.8 (pentaerythritol/the isotridecanoic acid B).

Production Example 5

[Production of Ester of 2-Ethylhexanoic Acid and Pentaerythritol (Ester Additive (a)-3)]

An ester additive (a)-3 was obtained by conducting the same manner as in Production Example 3, except that 2-ethylhexanoic acid was used instead of the isotridecanoic acid A, and that the molar ratio between the amounts of pentaerythritol and 2-ethylhexanoic acid used was set to 1/4.8 (pentaerythritol/2-ethylhexanoic acid).

Table 1 shows the compositions of the ester additives (a)-1, (a)-2, and (a)-3.

TABLE 1

| | | Ester additive (a)-1 (Production Example 3) | Ester additive (a)-2 (Production Example 4) | Ester additive (a)-3 (Production Example 5) |
|---|---|---|---|---|
| Alcohol | | PE | PE | PE |
| Ratio of carboxylic acid (molar ratio) | isotridecanoic acid A | 100 | | |
| | isotridecanoic acid B | | 100 | |
| | 2-ethylhexanoic acid | | | 100 |

TABLE 1-continued

| | | Ester additive (a)-1 (Production Example 3) | Ester additive (a)-2 (Production Example 4) | Ester additive (a)-3 (Production Example 5) |
|---|---|---|---|---|
| Kinematic viscosity (mm$^2$/s) | 40° C. | 99.1 | 197.2 | 44.1 |
| | 100° C. | 12.0 | 16.3 | 6.2 |

Production Example 6

[Production of Ester of Pentaerythritol with 2-Ethylhexanoic Acid and 3,5,5-Trimethylhexanoic Acid in Molar Ratio (2-Ethylhexanoic Acid/3,5,5-Trimethylhexanoic Acid Ratio) of 51/49 (Ester Base Oil (b)-1)]

An ester base oil (b)-1 was obtained by conducting the same manner as in Production Example 3, except that a fatty acid mixture of 2-ethylhexanoic acid and 3,5,5-trimethylhexanoic acid was used instead of the isotridecanoic acid A, and that the molar ratio among the amounts of pentaerythritol, 2-ethylhexanoic acid, and 3,5,5-trimethylhexanoic acid used was set to 1/2.74/2.06 (pentaerythritol/2-ethylhexanoic acid/3,5,5-trimethylhexanoic acid).

Production Example 7

[Production of Ester of Pentaerythritol with 2-Ethylhexanoic Acid and 3,5,5-Trimethylhexanoic Acid in Molar Ratio (2-Ethylhexanoic Acid/3,5,5-Trimethylhexanoic Acid Ratio) of 65/35 (Ester Base Oil (b)-2)]

An ester base oil (b)-2 was obtained by conducting the same manner as in Production Example 3, except that a fatty acid mixture of 2-ethylhexanoic acid and 3,5,5-trimethylhexanoic acid was used instead of the isotridecanoic acid A, and that the molar ratio among the amounts of pentaerythritol, 2-ethylhexanoic acid, and 3,5,5-trimethylhexanoic acid used was set to 1/3.22/1.58 (pentaerythritol/2-ethylhexanoic acid/3,5,5-trimethylhexanoic acid).

Production Example 8

[Production of Ester of Pentaerythritol with Isobutyric Acid and 3,5,5-Trimethylhexanoic Acid in Molar Ratio (Isobutyric Acid/3,5,5-Trimethylhexanoic Acid Ratio) of 37/63 (Ester Base Oil (b)-3)]

An ester base oil (b)-3 was obtained by conducting the same manner as in Production Example 3, except that a fatty acid mixture of isobutyric acid and 3,5,5-trimethylhexanoic acid was used instead of the isotridecanoic acid A, and that the molar ratio among the amounts of pentaerythritol, isobutyric acid, and 3,5,5-trimethylhexanoic acid used was set to 1/1.78/3.02 (pentaerythritol/isobutyric acid/3,5,5-trimethylhexanoic acid).

Production Example 9

[Production of Ester of Pentaerythritol with Isobutyric Acid and 3,5,5-Trimethylhexanoic Acid in Molar Ratio (Isobutyric Acid/3,5,5-Trimethylhexanoic Acid Ratio) of 59/41 (Ester Base Oil (b)-4)]

An ester base oil (b)-4 was obtained by conducting the same manner as in Production Example 3, except that a fatty acid mixture of isobutyric acid and 3,5,5-trimethylhexanoic acid was used instead of the isotridecanoic acid A, and that the molar ratio among the amounts of pentaerythritol, isobutyric acid, and 3,5,5-trimethylhexanoic acid used was set to 1/2.88/1.92 (pentaerythritol/isobutyric acid/3,5,5-trimethylhexanoic acid).

Production Example 10

[Production of Ester of Pentaerythritol with Pentanoic Acid and 3,5,5-Trimethylhexanoic Acid in Molar Ratio (Pentanoic Acid/3,5,5-Trimethylhexanoic Acid Ratio) of 27/73 (Ester Base Oil (b)-5)]

An ester base oil (b)-5 was obtained by conducting the same manner as in Production Example 3, except that a fatty acid mixture of pentanoic acid and 3,5,5-trimethylhexanoic acid was used instead of the isotridecanoic acid A, and that the molar ratio among the amounts of pentaerythritol, pentanoic acid, and 3,5,5-trimethylhexanoic acid used was set to 1/1.30/3.50 (pentaerythritol/pentanoic acid/3,5,5-trimethylhexanoic acid).

Production Example 11

[Production of Ester of Pentaerythritol with Pentanoic Acid, Heptanoic Acid, and 3,5,5-Trimethylhexanoic Acid in Molar Ratio (Pentanoic Acid/Heptanoic Acid/3,5,5-Trimethylhexanoic Acid Ratio) of 39/24/37 (Ester Base Oil (b)-6)]

An ester base oil (b)-6 was obtained by conducting the same manner as in Production Example 3, except that a fatty acid mixture of pentanoic acid, heptanoic acid, and 3,5,5-trimethylhexanoic acid was used instead of the isotridecanoic acid A, and that the molar ratio among the amounts of pentaerythritol, pentanoic acid, heptanoic acid, and 3,5,5-trimethylhexanoic acid used was set to 1/1.82/1.13/1.85 (pentaerythritol/pentanoic acid/heptanoic acid/3,5,5-trimethylhexanoic acid).

Production Example 12

[Production of Mixture of Ester of Pentaerythritol and Ester of Dipentaerythritol with Pentanoic Acid, Heptanoic Acid, and 3,5,5-Trimethylhexanoic Acid in Molar Ratio (Pentanoic Acid/Heptanoic Acid/3,5,5-Trimethylhexanoic Acid Ratio) of 41/20/39 and Pentaerythritol/Dipentaerythritol Molar Ratio (Pentaerythritol/Dipentaerythritol Ratio) of 67/33 (Ester Base Oil (b)-7)]

An ester base oil (b)-7 was obtained by conducting the same manner as in Production Example 3, except that a fatty acid mixture of pentanoic acid, heptanoic acid, and 3,5,5-trimethylhexanoic acid was used instead of the isotridecanoic acid A, that an alcohol mixture of pentaerythritol and dipentaerythritol was used instead of pentaerythritol, and that the molar ratio among the amounts of pentanoic acid, heptanoic acid, 3,5,5-trimethylhexanoic acid, pentaerythritol, and dipentaerythritol used was set to 1/0.50/3.36/1.68/3.36 (pentaerythritol/dipentaerythritol/pentanoic acid/heptanoic acid/3,5,5-trimethylhexanoic acid).

Production Example 13

[Production of Ester of 2-Ethylhexanoic Acid and Neopentyl Glycol (Ester Base Oil (b)-8)]

An ester base oil (b)-8 was obtained by conducting the same manner as in Production Example 3, except that 2-ethylhexanoic acid was used instead of the isotridecanoic acid A, that neopentyl glycol was used instead of pentaerythritol, and that the molar ratio between the amounts of neopentyl glycol and 2-ethylhexanoic acid used was set to 1/2.4 (neopentyl glycol/2-ethylhexanoic acid).

Production Example 14

[Production of Ester of Isotridecanoic Acid A and Neopentyl Glycol (Ester Base Oil (b)-9)]

An ester base oil (b)-9 was obtained by conducting the same manner as in Production Example 3, except that neopentyl glycol was used instead of pentaerythritol, and that the molar ratio between the amounts of neopentyl glycol and the isotridecanoic acid A used was set to 1/2.4 (neopentyl glycol/the isotridecanoic acid A).

Examples 1 to 36, Comparative Examples 1 to 9

Refrigerating machine oil compositions 1 to 45 having compositions shown in Tables 2 to 9 were prepared using the ester additives (a) of Production Examples 3 to 5 and the ester base oils (b) of Production Examples 6 to 14.

Examples 37 to 53

In Examples 37 to 53, refrigerating machine oil compositions 46 to 62 having compositions shown in Tables 10 to 12 were prepared using the refrigerating machine oil compositions 1, 3, 8, 28, 32, 34, and 35 and lubricant additives described below.

Antioxidant: 2,6-di-tert-butyl-4-methylphenol
Acid scavenger-1: neodecanoic acid glycidyl ester
Acid scavenger-2: 2-ethylhexyl glycidyl ether
Extreme pressure agent-1: tricresyl phosphate
Extreme pressure agent-2: Lubdyne 3000 (manufactured by SC Organic Chemical Co., Ltd.)

For each of the refrigerating machine oil compositions, the following evaluation tests were carried out.

Test Example 1

Measurement of Kinematic Viscosity

The ester additives (a)-1 to (a)-3 and the refrigerating machine oil compositions 1 to 62 were measured for the kinematic viscosity at 40° C. and 100° C. according to the method of JIS K2283:2000 using a Cannon-Fenske viscometer. Moreover, the viscosity indexes of the refrigerating machine oil compositions 1 to 62 were calculated according to this method. Tables 1 to 12 show the results.

Test Example 2

Measurement of Pour Point

The refrigerating machine oil compositions 1 to 45 were measured for the pour point according to the method of JIS K2269:1987 using an automatic pour point tester RPC-01CML (manufactured by Rigo Co., Ltd.). The result is shown below.

Test Example 3

Measurement of Wear Scar Diameter (Evaluations of Lubricity and Additive Response)

1) Preparation of TCP•BZT-Added Oils
A TCP•BZT-added oil 1 was prepared by mixing 19.78 g of the refrigerating machine oil composition 1, 0.2 g of tricresyl phosphate (TCP, manufactured by Tokyo Chemical Industry Co., Ltd.), and 0.02 g of benzotriazole (BZT, manufactured by Sigma-Aldrich Co.), and dissolving the mixture at 50° C. As to the refrigerating machine oil compositions 2 to 45, corresponding TCP•BZT-added oils 2 to 45 were prepared by the same process.

2) Measurement of Wear Scar Diameter
Each of the refrigerating machine oil compositions 1 to 45 and the TCP•BZT-added oils 1 to 45 was measured for the wear scar diameter using a shell four-ball friction tester (manufactured by Shinko Engineering Co., Ltd.). A test was conducted under conditions of load: 230 N, rotating speed: 600 rpm, time: 20 minutes, temperature: 40° C., and test material: [test balls (SUJ-2)]. After the test, the wear scar on three stationary balls was observed. A case where seizure was observed on at least one of the stationary balls was evaluated as "seizure". A case where no seizure was observed was measured for the wear scar diameters on the three stationary balls. An average value of the three stationary balls in all the vertical direction and the horizontal direction was regarded as the wear scar diameter. Tables 2 to 9 show the result. A smaller value of the wear scar diameter indicates that the refrigerating machine oil composition has an excellent lubricity (anti-wear properties). A larger difference between the wear scar diameter of the refrigerating machine oil composition and the wear scar diameter of the corresponding TCP•BZT-added oil indicates that the refrigerating machine oil composition has a higher additive response.

Test Example 4

Measurement of Two-Phase Separation Temperature with HFO-1234ze (Evaluation of Refrigerant Miscibility)

A mixture of 0.6 g of one of the refrigerating machine oil compositions 1 to 62 and 2.4 g of HFO-1234ze (manufactured by Honeywell International, Inc.) was sealed in a pressure-resistant glass tube. The mixture was cooled from 30° C. at a rate of 0.5° C. per minute according to the method of JIS K2211:2009. A temperature at which the mixture was separated into two phases or turned cloudy was regarded as the two-phase separation temperature. Tables 2 to 12 show the result.

Test Example 5

Measurement of Two-Phase Separation Temperature with Refrigerant Mixture of HFO-1234ze and HFC-32 (Confirmation of Refrigerant Miscibility)

A mixture of 0.6 g of one of the refrigerating machine oil compositions 1 to 45 and 2.4 g of the following refrigerant mixture was sealed in a pressure-resistant glass tube. The two-phase separation temperature was measured by the same process as in Test Example 4. The result is shown below.

<Refrigerant Mixture>
A refrigerant mixture of HFO-1234ze (manufactured by Honeywell International, Inc.) and HFC-32 (manufactured by Daikin Industries, Ltd.) (the mass ratio of HFO-1234ze and HFC-32: 79/21 [HFO-1234ze/HFC-32])

Test Example 6

Measurement of Refrigerant-Solution Viscosity

The refrigerating machine oil composition was placed in a pressure-resistant vessel equipped with a piston viscometer (VISCOpro 2000) manufactured by Cambridge Viscosity, Inc. The inside of the vessel was vacuum-degassed. Then, HFO-1234ze (manufactured by Honeywell International, Inc.) was introduced therein. While the mixture of the refrigerating machine oil composition 2 and HFO-1234ze was being stirred, HFO-1234ze was added or drawn out to keep the absolute pressure at 500 kPa at 60° C. When the temperature, the pressure, and the viscosity were stabilized, the mixture of the refrigerating machine oil composition 2 and HFO-1234ze was measured for the refrigerant-solution viscosity. The refrigerating machine oil compositions 3, 7, 14, 37, 39, and 41 were also measured for the refrigerant-solution viscosity by the same process. The result is shown below.

Test Example 7

Measurement of Wear Scar Width (Evaluation of Lubricity in Presence of Refrigerant)

Working fluid compositions for refrigerating machines were evaluated for the lubricity by a friction and wear test according to ASTM D2714. A block-on-ring friction and wear testing machine (manufactured by FALEX Corporation) of a sealed pressurization type was used in which a sliding portion was housed in a pressure-resistant vessel. Specifically, 100 ml of one of the refrigerating machine oil compositions 1 to 45 was placed in the pressure-resistant vessel. Then, while HFO-1234ze (manufactured by Honeywell International, Inc.) or the refrigerant mixture described in Test Example 5 was being introduced as a refrigerant to keep the absolute pressure inside the pressure-resistant vessel at 600 kPa, the friction and wear test was carried out under the following conditions. After the friction and wear test, the wear scar on the block test piece was observed. A case where seizure was observed was evaluated as "seizure". A case where no seizure was observed was measured for the wear scar width on the block test piece. Tables 2 to 9 show the result.

<Conditions>
Test materials: rings (FALEX Type S-10), blocks (FALEX Type H-60)
Initial test temperature: 60° C.
Test time: 1 hour
Sliding speed: 0.5 m/s
Load: 600 N
Absolute pressure of refrigerant atmosphere: 600 kPa Test Example 8

Measurement of Wear Scar Width (Evaluation of Lubricity of Refrigerating Machine Oil Compositions Containing Lubricant Additives in Presence of Refrigerant HFO-1234ze)

The refrigerating machine oil compositions 46 to 62 were subjected to a friction and wear test by the same process as in Test Example 7 using HFO-1234ze (manufactured by Honeywell International, Inc.) as a refrigerant. After the friction and wear test, the wear scar on the block test piece was observed. A case where seizure was observed was evaluated as "seizure". A case where no seizure was observed was measured for the wear scar width on the block test piece. Tables 10 to 12 show the result.

Test Example 9

Measurement of Wear Scar Width (Evaluation of Lubricity of Refrigerating Machine Oil Compositions Containing Lubricant Additives in Presence of Refrigerant Mixture of HFO-1234ze and HFC-32)

The refrigerating machine oil compositions 52 and 56 were subjected to a friction and wear test by the same process as in Test Example 7 using the refrigerant mixture described in Test Example 5 as a refrigerant. After the friction and wear test, the wear scar on the block test piece was observed. A case where seizure was observed was evaluated as "seizure". A case where no seizure was observed was measured for the wear scar width on the block test piece. The result is shown below.

TABLE 2

|  |  | Refrigerating machine oil composition 1 (Example 1) | Refrigerating machine oil composition 2 (Example 2) | Refrigerating machine oil composition 3 (Example 3) | Refrigerating machine oil composition 4 (Example 4) | Refrigerating machine oil composition 5 (Example 5) | Refrigerating machine oil composition 6 (Example 6) |
|---|---|---|---|---|---|---|---|
| Composition (mass ratio) | Ester additive (a)-1 | 10 | 20 | 30 | 40 | 26.4 | 30 |
|  | Ester additive (a)-2 |  |  |  |  |  |  |
|  | Ester additive (a)-3 |  |  |  |  |  |  |
|  | Ester base oil (b)-1 | 90 | 80 | 70 | 60 | 70 | 49 |
|  | Ester base oil (b)-2 |  |  |  |  |  |  |
|  | Ester base oil (b)-3 |  |  |  |  |  |  |
|  | Ester base oil (b)-4 |  |  |  |  |  |  |
|  | Ester base oil (b)-5 |  |  |  |  |  |  |
|  | Ester base oil (b)-6 |  |  |  |  |  |  |
|  | Ester base oil (b)-7 |  |  |  |  |  |  |

TABLE 2-continued

|  |  | Refrigerating machine oil composition 1 (Example 1) | Refrigerating machine oil composition 2 (Example 2) | Refrigerating machine oil composition 3 (Example 3) | Refrigerating machine oil composition 4 (Example 4) | Refrigerating machine oil composition 5 (Example 5) | Refrigerating machine oil composition 6 (Example 6) |
|---|---|---|---|---|---|---|---|
|  | Ester base oil (b)-8 |  |  |  |  | 3.6 | 21 |
|  | Ester base oil (b)-9 |  |  |  |  |  |  |
| Kinematic viscosity (mm$^2$/s) | 40° C. | 71.9 | 74.6 | 76.7 | 79.4 | 67.8 | 41.8 |
|  | 100° C. | 8.8 | 9.1 | 9.4 | 9.7 | 8.6 | 6.5 |
|  | Viscosity index | 93 | 96 | 99 | 100 | 99 | 107 |
| Two-phase separation temperature [° C.] | HFO-1234ze | <−60 | −46 | −28 | −14 | −37 | −34 |
| Wear scar diameter [mm] Four-ball test (without refrigerant) | Without TCP•BZT added | 0.52 | 0.52 | 0.51 | 0.51 | 0.52 | 0.53 |
|  | With TCP•BZT added (TCP•BZT-added oil) | 0.28 | 0.29 | 0.30 | 0.27 | 0.28 | 0.34 |
| Wear scar width [mm] Block-on-ring test (with refrigerant) | HFO-1234ze | 0.54 | 0.62 | 0.66 | 0.67 | 0.74 | 0.64 |
|  | HFO-1234ze/ HFC-32 (molar ratio: 79/21)) | 0.52 | 0.59 | 0.57 | 0.54 | 0.52 | 0.49 |

TABLE 3

|  |  | Refrigerating machine oil composition 7 (Example 7) | Refrigerating machine oil composition 8 (Example 8) | Refrigerating machine oil composition 9 (Example 9) | Refrigerating machine oil composition 10 (Example 10) | Refrigerating machine oil composition 11 (Example 11) | Refrigerating machine oil composition 12 (Example 12) |
|---|---|---|---|---|---|---|---|
| Composition (mass ratio) | Ester additive (a)-1 | 33.1 |  |  |  | 30 | 10 |
|  | Ester additive (a)-2 |  | 25 | 30 | 35 |  |  |
|  | Ester additive (a)-3 |  |  |  |  |  |  |
|  | Ester base oil (b)-1 | 57 | 75 | 60 | 65 |  |  |
|  | Ester base oil (b)-2 |  |  |  |  | 70 |  |
|  | Ester base oil (b)-3 |  |  |  |  |  | 90 |
|  | Ester base oil (b)-4 |  |  |  |  |  |  |
|  | Ester base oil (b)-5 |  |  |  |  |  |  |
|  | Ester base oil (b)-6 |  |  |  |  |  |  |
|  | Ester base oil (b)-7 |  |  |  |  |  |  |
|  | Ester base oil (b)-8 |  |  | 10 |  |  |  |
|  | Ester base oil (b)-9 | 9.9 |  |  |  |  |  |
| Kinematic viscosity (mm$^2$/s) | 40° C. | 66.9 | 89.0 | 68.7 | 99.1 | 68.7 | 70.3 |
|  | 100° C. | 8.7 | 9.9 | 8.5 | 10.7 | 8.7 | 8.5 |
|  | Viscosity index | 103 | 88 | 92 | 89 | 99 | 89 |
| Two-phase separation temperature [° C.] | HFO-1234ze | −22 | −58 | −56 | −48 | −30 | <−60 |
| Wear scar diameter [mm] Four-ball test (without refrigerant) | Without TCP•BZT added | 0.51 | 0.52 | 0.50 | 0.50 | 0.53 | 0.50 |
|  | With TCP•BZT added (TCP•BZT-added oil) | 0.27 | 0.27 | 0.27 | 0.27 | 0.27 | 0.36 |

TABLE 3-continued

|  |  | Refrigerating machine oil composition 7 (Example 7) | Refrigerating machine oil composition 8 (Example 8) | Refrigerating machine oil composition 9 (Example 9) | Refrigerating machine oil composition 10 (Example 10) | Refrigerating machine oil composition 11 (Example 11) | Refrigerating machine oil composition 12 (Example 12) |
|---|---|---|---|---|---|---|---|
| Wear scar width [mm] Block-on-ring test (with refrigerant) | HFO-1234ze | 0.69 | 0.66 | 0.68 | 0.72 | 0.68 | 0.78 |
|  | HFO-1234ze/ HFC-32 (molar ratio: 79/21)) | 0.60 | 0.57 | 0.60 | 0.65 | 0.54 | 0.56 |

TABLE 4

|  |  | Refrigerating machine oil composition 13 (Example 13) | Refrigerating machine oil composition 14 (Example 14) | Refrigerating machine oil composition 15 (Example 15) | Refrigerating machine oil composition 16 (Example 16) | Refrigerating machine oil composition 17 (Example 17) | Refrigerating machine oil composition 18 (Example 18) |
|---|---|---|---|---|---|---|---|
| Composition (mass ratio) | Ester additive (a)-1 | 20 | 30 | 40 | 32.3 |  | 10 |
|  | Ester additive (a)-2 |  |  |  |  | 25 |  |
|  | Ester additive (a)-3 |  |  |  |  |  |  |
|  | Ester base oil (b)-1 |  |  |  |  |  |  |
|  | Ester base oil (b)-2 |  |  |  |  |  |  |
|  | Ester base oil (b)-3 | 80 | 70 | 60 | 58 | 75 |  |
|  | Ester base oil (b)-4 |  |  |  |  |  | 90 |
|  | Ester base oil (b)-5 |  |  |  |  |  |  |
|  | Ester base oil (b)-6 |  |  |  |  |  |  |
|  | Ester base oil (b)-7 |  |  |  |  |  |  |
|  | Ester base oil (b)-8 |  |  |  |  |  |  |
|  | Ester base oil (b)-9 |  |  |  | 9.7 |  |  |
| Kinematic viscosity (mm$^2$/s) | 40° C. | 72.9 | 75.3 | 77.9 | 65.8 | 88.6 | 45.7 |
|  | 100° C. | 8.8 | 9.3 | 9.5 | 8.5 | 9.7 | 6.4 |
| Viscosity index |  | 92 | 98 | 98 | 100 | 85 | 86 |
| Two-phase separation temperature [° C.] | HFO-1234ze | −43 | −30 | −13 | −23 | <−60 | −55 |
| Wear scar diameter [mm] Four-ball test (without refrigerant) | Without TCP•BZT added | 0.50 | 0.49 | 0.53 | 0.52 | 0.50 | 0.52 |
|  | With TCP•BZT added (TCP•BZT-added oil) | 0.28 | 0.31 | 0.30 | 0.37 | 0.27 | 0.37 |
| Wear scar width [mm] Block-on-ring test (with refrigerant) | HFO-1234ze | 0.73 | 0.77 | 0.63 | 0.63 | 0.65 | 0.63 |
|  | HFO-1234ze/ HFC-32 (molar ratio: 79/21)) | 0.54 | 0.59 | 0.52 | 0.52 | 0.61 | 0.46 |

TABLE 5

|  |  | Refrigerating machine oil composition 19 (Example 19) | Refrigerating machine oil composition 20 (Example 20) | Refrigerating machine oil composition 21 (Example 21) | Refrigerating machine oil composition 22 (Example 22) | Refrigerating machine oil composition 23 (Example 23) | Refrigerating machine oil composition 24 (Example 24) |
|---|---|---|---|---|---|---|---|
| Composition (mass ratio) | Ester additive (a)-1 | 20 | 30 | 20 | 30 | 10 | 20 |
|  | Ester additive (a)-2 |  |  |  |  |  |  |
|  | Ester additive (a)-3 |  |  |  |  |  |  |
|  | Ester base oil (b)-1 |  |  |  |  |  |  |
|  | Ester base oil (b)-2 |  |  |  |  |  |  |
|  | Ester base oil (b)-3 |  |  |  |  |  |  |
|  | Ester base oil (b)-4 | 80 | 70 | 75 | 61 | 73 | 60 |
|  | Ester base oil (b)-5 |  |  |  |  |  |  |
|  | Ester base oil (b)-6 |  |  |  |  |  |  |
|  | Ester base oil (b)-7 |  |  |  |  |  |  |
|  | Ester base oil (b)-8 |  |  | 5 | 9 | 17 | 20 |
|  | Ester base oil (b)-9 |  |  |  |  |  |  |
| Kinematic viscosity ($mm^2/s$) | 40° C. | 52.2 | 56.4 | 45.6 | 44.7 | 32.3 | 32.7 |
|  | 100° C. | 7.1 | 7.6 | 6.6 | 6.6 | 5.2 | 5.4 |
| Viscosity index |  | 90 | 95 | 94 | 99 | 88 | 96 |
| Two-phase separation temperature [° C.] | HFO-1234ze | −39 | −23 | −39 | −24 | <−60 | −43 |
| Wear scar diameter [mm] Four-ball test (without refrigerant) | Without TCP•BZT added | 0.53 | 0.51 | 0.52 | 0.53 | 0.52 | 0.53 |
|  | With TCP•BZT added (TCP•BZT-added oil) | 0.36 | 0.37 | 0.37 | 0.37 | 0.35 | 0.37 |
| Wear scar width [mm] Block-on-ring test (with refrigerant) | HFO-1234ze | 0.72 | 0.71 | 0.57 | 0.73 | 0.71 | 0.62 |
|  | HFO-1234ze/HFC-32 (molar ratio: 79/21)) | 0.53 | 0.50 | 0.53 | 0.54 | 0.57 | 0.54 |

TABLE 6

|  |  | Refrigerating machine oil composition 25 (Example 25) | Refrigerating machine oil composition 26 (Example 26) | Refrigerating machine oil composition 27 (Example 27) | Refrigerating machine oil composition 28 (Example 28) | Refrigerating machine oil composition 29 (Example 29) | Refrigerating machine oil composition 30 (Example 30) |
|---|---|---|---|---|---|---|---|
| Composition (mass ratio) | Ester additive (a)-1 | 30 |  | 20 | 30 | 10 | 30 |
|  | Ester additive (a)-2 |  | 25 |  |  |  |  |
|  | Ester additive (a)-3 |  |  |  |  |  |  |
|  | Ester base oil (b)-1 |  |  |  |  |  |  |
|  | Ester base oil (b)-2 |  |  |  |  |  |  |
|  | Ester base oil (b)-3 |  |  | 70 | 49 |  |  |
|  | Ester base oil (b)-4 | 46 | 75 | 10 | 21 |  |  |
|  | Ester base oil (b)-5 |  |  |  |  | 90 | 70 |
|  | Ester base oil (b)-6 |  |  |  |  |  |  |
|  | Ester base oil (b)-7 |  |  |  |  |  |  |

TABLE 6-continued

|  |  | Refrigerating machine oil composition 25 (Example 25) | Refrigerating machine oil composition 26 (Example 26) | Refrigerating machine oil composition 27 (Example 27) | Refrigerating machine oil composition 28 (Example 28) | Refrigerating machine oil composition 29 (Example 29) | Refrigerating machine oil composition 30 (Example 30) |
|---|---|---|---|---|---|---|---|
|  | Ester base oil (b)-8 | 24 |  |  |  |  |  |
|  | Ester base oil (b)-9 |  |  |  |  |  |  |
| Kinematic viscosity (mm²/s) | 40° C. | 32.5 | 63.2 | 69.6 | 68.9 | 66.2 | 72.1 |
|  | 100° C. | 5.4 | 7.8 | 8.6 | 8.6 | 8.6 | 9.3 |
|  | Viscosity index | 100 | 84 | 92 | 95 | 101 | 104 |
| Two-phase separation temperature [° C.] | HFO-1234ze | −47 | −57 | −40 | −27 | <−60 | −31 |
| Wear scar diameter [mm] Four-ball test (without refrigerant) | Without TCP•BZT added | 0.53 | 0.50 | 0.51 | 0.51 | 0.50 | 0.52 |
|  | With TCP•BZT added (TCP•BZT-added oil) | 0.34 | 0.37 | 0.27 | 0.27 | 0.30 | 0.32 |
| Wear scar width [mm] Block-on-ring test (with refrigerant) | HFO-1234ze | 0.70 | 0.64 | 0.65 | 0.80 | 0.73 | 0.70 |
|  | HFO-1234ze/ HFC-32 (molar ratio: 79/21)) | 0.53 | 0.59 | 0.47 | 0.49 | 0.48 | 0.46 |

TABLE 7

|  |  | Refrigerating machine oil composition 31 (Example 31) | Refrigerating machine oil composition 32 (Example 32) | Refrigerating machine oil composition 33 (Example 33) | Refrigerating machine oil composition 34 (Example 34) | Refrigerating machine oil composition 35 (Example 35) | Refrigerating machine oil composition 36 (Example 36) |
|---|---|---|---|---|---|---|---|
| Composition (mass ratio) | Ester additive (a)-1 | 10 | 30 |  | 20 | 30 |  |
|  | Ester additive (a)-2 |  |  | 25 |  |  | 25 |
|  | Ester additive (a)-3 |  |  |  |  |  |  |
|  | Ester base oil (b)-1 |  |  |  |  |  |  |
|  | Ester base oil (b)-2 |  |  |  |  |  |  |
|  | Ester base oil (b)-3 |  |  |  |  |  |  |
|  | Ester base oil (b)-4 |  |  |  |  |  |  |
|  | Ester base oil (b)-5 |  |  |  |  |  |  |
|  | Ester base oil (b)-6 | 90 | 70 | 75 |  |  |  |
|  | Ester base oil (b)-7 |  |  |  | 80 | 70 | 75 |
|  | Ester base oil (b)-8 |  |  |  |  |  |  |
|  | Ester base oil (b)-9 |  |  |  |  |  |  |
| Kinematic viscosity (mm²/s) | 40° C. | 35.9 | 44.5 | 48.4 | 66.8 | 69.7 | 84.2 |
|  | 100° C. | 6.2 | 7.1 | 7.3 | 9.4 | 9.7 | 10.6 |
|  | Viscosity index | 122 | 120 | 111 | 119 | 119 | 109 |
| Two-phase separation temperature [° C.] | HFO-1234ze | <−60 | −32 | <−60 | −41 | −30 | <−60 |
| Wear scar diameter [mm] Four-ball test (without refrigerant) | Without TCP•BZT added | 0.50 | 0.52 | 0.50 | 0.47 | 0.47 | 0.52 |
|  | With TCP•BZT added (TCP•BZT-added oil) | 0.34 | 0.35 | 0.37 | 0.29 | 0.29 | 0.37 |

TABLE 7-continued

|  |  | Refrigerating machine oil composition 31 (Example 31) | Refrigerating machine oil composition 32 (Example 32) | Refrigerating machine oil composition 33 (Example 33) | Refrigerating machine oil composition 34 (Example 34) | Refrigerating machine oil composition 35 (Example 35) | Refrigerating machine oil composition 36 (Example 36) |
|---|---|---|---|---|---|---|---|
| Wear scar width [mm] Block-on-ring test (with refrigerant) | HFO-1234ze | 0.61 | 0.60 | 0.59 | 0.75 | 0.77 | 0.68 |
|  | HFO-1234ze/ HFC-32 (molar ratio: 79/21)) | 0.48 | 0.52 | 0.55 | 0.61 | 0.65 | 0.63 |

TABLE 8

|  |  | Refrigerating machine oil composition 37 (Comparative Example 1) | Refrigerating machine oil composition 38 (Comparative Example 2) | Refrigerating machine oil composition 39 (Comparative Example 3) | Refrigerating machine oil composition 40 (Comparative Example 4) | Refrigerating machine oil composition 41 (Comparative Example 5) | Refrigerating machine oil composition 42 (Comparative Example 6) |
|---|---|---|---|---|---|---|---|
| Composition (mass ratio) | Ester additive (a)-1 |  | 50 |  |  |  |  |
|  | Ester additive (a)-2 |  |  |  |  |  |  |
|  | Ester additive (a)-3 |  |  | 20 |  |  |  |
|  | Ester base oil (b)-1 | 100 | 50 | 80 |  |  |  |
|  | Ester base oil (b)-2 |  |  |  | 100 |  |  |
|  | Ester base oil (b)-3 |  |  |  |  | 100 |  |
|  | Ester base oil (b)-4 |  |  |  |  |  | 100 |
|  | Ester base oil (b)-5 |  |  |  |  |  |  |
|  | Ester base oil (b)-6 |  |  |  |  |  |  |
|  | Ester base oil (b)-7 |  |  |  |  |  |  |
|  | Ester base oil (b)-8 |  |  |  |  |  |  |
|  | Ester base oil (b)-9 |  |  |  |  |  |  |
| Kinematic viscosity (mm$^2$/s) | 40° C. | 69.6 | 82.1 | 62.5 | 60.0 | 68.7 | 45.4 |
|  | 100° C. | 8.6 | 10.0 | 7.9 | 7.7 | 8.2 | 6.3 |
| Viscosity index |  | 92 | 102 | 90 | 90 | 86 | 79 |
| Two-phase separation temperature [° C.] | HFO-1234ze | <−60 | 3 | <−60 | <−60 | <−60 | <−60 |
| Wear scar diameter [mm] Four-ball test (without refrigerant) | Without TCP•BZT added | 0.56 | 0.50 | 0.56 | 0.55 | 0.55 | 0.55 |
|  | With TCP•BZT added (TCP•BZT-added oil) | 0.46 | 0.26 | seizure | 0.47 | 0.46 | 0.47 |
| Wear scar width [mm] Block-on-ring test (with refrigerant) | HFO-1234ze | 0.80 | 0.67 | 0.66 | seizure | seizure | seizure |
|  | HFO-1234ze/ HFC-32 (molar ratio: 79/21)) | seizure | 0.57 | 0.61 | 0.61 | 0.72 | 0.70 |

TABLE 9

|  |  | Refrigerating machine oil composition 43 (Comparative Example 7) | Refrigerating machine oil composition 44 (Comparative Example 8) | Refrigerating machine oil composition 45 (Comparative Example 9) |
|---|---|---|---|---|
| Composition (mass ratio) | Ester additive (a)-1 | | | |
| | Ester additive (a)-2 | | | |
| | Ester additive (a)-3 | | | |
| | Ester base oil (b)-1 | | | |
| | Ester base oil (b)-2 | | | |
| | Ester base oil (b)-3 | | | |
| | Ester base oil (b)-4 | | | |
| | Ester base oil (b)-5 | 100 | | |
| | Ester base oil (b)-6 | | 100 | |
| | Ester base oil (b)-7 | | | 100 |
| | Ester base oil (b)-8 | | | |
| | Ester base oil (b)-9 | | | |
| Kinematic viscosity ($mm^2/s$) | 40° C. | 63.3 | 31.8 | 60.6 |
| | 100° C. | 8.3 | 5.7 | 8.9 |
| Viscosity index | | 101 | 120 | 122 |
| Two-phase separation temperature [° C.] | HFO-1234ze | <−60 | <−60 | <−60 |
| Wear scar diameter [mm] Four-ball test (without refrigerant) | Without TCP•BZT added | 0.57 | 0.55 | 0.55 |
| | With TCP•BZT added (TCP•BZT-added oil) | 0.48 | 0.47 | 0.45 |
| Wear scar width [mm] Block-on-ring test (with refrigerant) | HFO-1234ze | seizure | seizure | seizure |
| | HFO-1234ze/HFC-32 (molar ratio: 79/21)) | 0.66 | 0.61 | 0.63 |

TABLE 10

|  |  | Refrigerating machine oil composition 46 (Example 37) | Refrigerating machine oil composition 47 (Example 38) | Refrigerating machine oil composition 48 (Example 39) | Refrigerating machine oil composition 49 (Example 40) | Refrigerating machine oil composition 50 (Example 41) | Refrigerating machine oil composition 51 (Example 42) |
|---|---|---|---|---|---|---|---|
| Refrigerating machine oil composition (mass ratio relative to whole composition) | Refrigerating machine oil composition 1 | 99.0 | 98.0 | | | | |
| | Refrigerating machine oil composition 3 | | | 98.5 | 97.5 | 97.5 | 95.0 |
| | Refrigerating machine oil composition 8 | | | | | | |
| | Refrigerating machine oil composition 28 | | | | | | |
| | Refrigerating machine oil composition 32 | | | | | | |
| | Refrigerating machine oil composition 34 | | | | | | |
| | Refrigerating machine oil composition 35 | | | | | | |

TABLE 10-continued

|  |  | Refrigerating machine oil composition 46 (Example 37) | Refrigerating machine oil composition 47 (Example 38) | Refrigerating machine oil composition 48 (Example 39) | Refrigerating machine oil composition 49 (Example 40) | Refrigerating machine oil composition 50 (Example 41) | Refrigerating machine oil composition 51 (Example 42) |
|---|---|---|---|---|---|---|---|
| Lubricant additive (mass ratio relative to whole composition) | Antioxidant | 1.0 | 0.5 | 0.5 | 0.5 | 0.5 | |
| | Acid scavenger-1 | | 1.0 | 1.0 | 1.0 | | 5.0 |
| | Acid scavenger-2 | | | | | 1.0 | |
| | Extreme pressure agent-1 | | | | 1.0 | 1.0 | |
| | Extreme pressure agent-2 | | 0.5 | | | | |
| Kinematic viscosity (mm²/s) | 40° C. | 71.5 | 68.7 | 75.4 | 75.1 | 75.3 | 62.7 |
| | 100° C. | 8.7 | 8.5 | 9.3 | 9.3 | 9.3 | 8.3 |
| Viscosity index | | 92 | 92 | 98 | 98 | 98 | 101 |
| Two-phase separation temperature [° C.] | HFO-1234ze | <−60 | <−60 | −30 | −30 | −31 | −35 |
| Wear scar width [mm] Block-on-ring test (with refrigerant) | HFO-1234ze | 0.49 | 0.45 | 0.68 | 0.58 | 0.61 | 0.69 |

TABLE 11

|  |  | Refrigerating machine oil composition 52 (Example 43) | Refrigerating machine oil composition 53 (Example 44) | Refrigerating machine oil composition 54 (Example 45) | Refrigerating machine oil composition 55 (Example 46) | Refrigerating machine oil composition 56 (Example 47) | Refrigerating machine oil composition 57 (Example 48) |
|---|---|---|---|---|---|---|---|
| Refrigerating machine oil composition (mass ratio relative to whole composition) | Refrigerating machine oil composition 1 | | | | | | |
| | Refrigerating machine oil composition 3 | | | | | | |
| | Refrigerating machine oil composition 8 | 97.5 | | | | | |
| | Refrigerating machine oil composition 28 | | 99.5 | 98.5 | 97.5 | | |
| | Refrigerating machine oil composition 32 | | | | | 97.5 | |
| | Refrigerating machine oil composition 34 | | | | | | 97.5 |
| | Refrigerating machine oil composition 35 | | | | | | |
| Lubricant additive (mass ratio relative to whole composition) | Antioxidant | 0.5 | 0.5 | 0.5 | 0.5 | 0.5 | 0.5 |
| | Acid scavenger-1 | 1.0 | | 1.0 | 1.0 | 1.0 | 1.0 |
| | Acid scavenger-2 | | | | | | |
| | Extreme pressure agent-1 | 1.0 | | | 1.0 | 1.0 | 1.0 |
| | Extreme pressure agent-2 | | | | | | |

TABLE 11-continued

|  |  | Refrigerating machine oil composition 52 (Example 43) | Refrigerating machine oil composition 53 (Example 44) | Refrigerating machine oil composition 54 (Example 45) | Refrigerating machine oil composition 55 (Example 46) | Refrigerating machine oil composition 56 (Example 47) | Refrigerating machine oil composition 57 (Example 48) |
|---|---|---|---|---|---|---|---|
| Kinematic viscosity ($mm^2/s$) | 40° C. | 87.1 | 68.8 | 67.6 | 67.3 | 43.2 | 65.6 |
|  | 100° C. | 9.7 | 8.6 | 8.5 | 8.4 | 6.9 | 9.2 |
|  | Viscosity index | 87 | 95 | 94 | 94 | 117 | 117 |
| Two-phase separation temperature [° C.] | HFO-1234ze | −55 | −26 | −28 | −28 | −33 | −42 |
| Wear scar width [mm] Block-on-ring test (with refrigerant) | HFO-1234ze | 0.60 | 0.69 | 0.73 | 0.53 | 0.54 | 0.64 |

TABLE 12

|  |  | Refrigerating machine oil composition 58 (Example 49) | Refrigerating machine oil composition 59 (Example 50) | Refrigerating machine oil composition 60 (Example 51) | Refrigerating machine oil composition 61 (Example 52) | Refrigerating machine oil composition 62 (Example 53) |
|---|---|---|---|---|---|---|
| Refrigerating machine oil composition (mass ratio relative to whole composition) | Refrigerating machine oil composition 1 |  |  |  |  |  |
|  | Refrigerating machine oil composition 3 |  |  |  |  |  |
|  | Refrigerating machine oil composition 8 |  |  |  |  |  |
|  | Refrigerating machine oil composition 28 |  |  |  |  |  |
|  | Refrigerating machine oil composition 32 |  |  |  |  |  |
|  | Refrigerating machine oil composition 34 |  |  |  |  |  |
|  | Refrigerating machine oil composition 35 | 99.5 | 99.0 | 98.5 | 98.5 | 97.5 |
| Lubricant additive (mass ratio relative to whole composition) | Antioxidant | 0.5 |  | 0.5 | 0.5 | 0.5 |
|  | Acid scavenger-1 |  | 1.0 | 1.0 |  | 1.0 |
|  | Acid scavenger-2 |  |  |  |  |  |
|  | Extreme pressure agent-1 |  |  |  | 1.0 | 1.0 |
|  | Extreme pressure agent-2 |  |  |  |  |  |
| Kinematic viscosity ($mm^2/s$) | 40° C. | 69.4 | 68.7 | 68.5 | 69.0 | 68.2 |
|  | 100° C. | 9.6 | 9.5 | 9.4 | 9.5 | 9.4 |
|  | Viscosity index | 118 | 117 | 116 | 117 | 116 |
| Two-phase separation temperature [° C.] | HFO-1234ze | −30 | −33 | −33 | −30 | −33 |
| Wear scar width [mm] Block-on-ring test (with refrigerant) | HFO-1234ze | 0.60 | 0.70 | 0.62 | 0.52 | 0.59 |

From Tables 2 to 7, the refrigerating machine oil compositions 1 to 36 had wear scar diameters of 0.47 mm to 0.53 mm. It can be seen that the refrigerating machine oil compositions 1 to 36 are excellent in lubricity in the absence of a refrigerant. Further, the added oil obtained by adding TCP and BZT to each of these had a wear scar diameter of 0.37 mm or less. It can be seen that the refrigerating machine oil compositions 1 to 36 are excellent also in additive response. In contrast, the refrigerating machine oil compositions 37 and 40 to 45, which are not the present invention, showed that the added oils obtained by adding TCP and BZT thereto had wear scar diameters of 0.45 mm or more. It can be seen that the additive response is not excellent. Additionally, the added oil of the refrigerating machine oil composition 39 had seizure.

From Tables 2 to 7 and 10 to 12, any of the refrigerating machine oil compositions 1 to 36 and 46 to 62 had a two-phase separation temperature with HFO-1234ze of −13° C. or less. It can be seen that the refrigerating machine oil compositions have excellent refrigerant miscibilities. In contrast, the refrigerating machine oil composition 38, which is not the present invention, had a two-phase separation temperature of 3° C. It can be seen that the refrigerating machine oil composition 38 does not have a sufficient refrigerant miscibility with HFO-1234ze.

From Tables 2 to 7, any of the working fluid compositions for refrigerating machines consisting of the refrigerating machine oil compositions 1 to 36 and HFO-1234ze had a wear scar width of 0.80 mm or less. Similarly, any of the working fluid compositions for refrigerating machines consisting of the refrigerating machine oil compositions 1 to 36 and the refrigerant mixture of HFO-1234ze and HFC-32 had a wear scar width of 0.65 mm or less. It can be seen that the working fluid compositions for refrigerating machines of the present invention are excellent in lubricity also in the presence of any refrigerant of HFO-1234ze and the refrigerant mixture of HFO-1234ze and HFC-32. In contrast, the refrigerating machine oil compositions 37 and 40 to 45, which are not the present invention, had seizure in the presence of a certain refrigerant. It can be seen that the refrigerating machine oil compositions are not excellent in lubricity.

From Tables 10 to 12, any of the working fluid compositions for refrigerating machines consisting of the refrigerating machine oil compositions 46 to 62 containing the lubricant additives and HFO-1234ze had a wear scar width of 0.73 mm or less. Moreover, in Test Example 9, the working fluid compositions for refrigerating machines consisting of the refrigerating machine oil compositions 52 and 56 containing the lubricant additives and the refrigerant mixture of HFO-1234ze and HFC-32 had wear scar widths of 0.54 mm and 0.49 mm, respectively. It can be seen that the refrigerating machine oil compositions of the present invention are excellent in lubricity in the presence of any refrigerant of not only HFO-1234ze but also the refrigerant mixture of HFO-1234ze and HFC-32.

Further, in Test Example 2, any of the refrigerating machine oil compositions 1 to 36 had a pour point of −40° C. or less. It can be seen that the refrigerating machine oil compositions of the present invention have sufficient low-temperature fluidities.

Furthermore, in Test Example 5, any of the refrigerating machine oil compositions 1 to 3, 5 to 6, 8 to 14, and 17 to 36 had a two-phase separation temperature with the refrigerant mixture of HFO-1234ze and HFC-32 of 0° C. or less. It can be seen that the refrigerating machine oil compositions of the present invention have excellent refrigerant miscibilities with not only HFO-1234ze but also the refrigerant mixture of HFO-1234ze and HFC-32. In contrast, the refrigerating machine oil composition 38, which is not the present invention, had a two-phase separation temperature of 20° C. or more and was poor in refrigerant miscibility with the refrigerant mixture of HFO-1234ze and HFC-32.

Furthermore, in Test Example 6, the refrigerating machine oil composition 2 had a refrigerant-solution viscosity of 9.2 cP, the refrigerating machine oil composition 3 had a refrigerant-solution viscosity of 9.9 cP, the refrigerating machine oil composition 7 had a refrigerant-solution viscosity of 9.8 cP, and the refrigerating machine oil composition 14 had a refrigerant-solution viscosity of 9.0 cP. It can be seen that the refrigerating machine oil compositions of the present invention have excellent refrigerant-solution viscosities. In contrast, the refrigerating machine oil compositions 37, 39, and 41, which are not the present invention, had refrigerant-solution viscosities of 7.8 cP, 7.2 cP, and 6.3 cP, respectively. It can be seen that the refrigerating machine oil compositions do not have sufficient refrigerant-solution viscosities in comparison with the refrigerating machine oil compositions of the present invention.

The present invention makes it possible to provide a refrigerating machine oil composition and a working fluid composition for refrigerating machines which have excellent properties such as lubricity, additive response, and refrigerant miscibility.

The invention claimed is:

1. A refrigerating machine oil composition comprising the following ester additive (a) and the following ester base oil (b), wherein
    a content of the ester additive (a) is within a range of 5% by mass to 45% by mass based on a total amount of the refrigerating machine oil composition,
    the ester additive (a) is an ester of isotridecanoic acid and pentaerythritol, and
    the ester base oil (b) comprises at least one ester of a polyhydric alcohol, wherein said at least one ester comprises an ester of pentaerythritol and at least two aliphatic monocarboxylic acids having 4 to 9 carbon atoms, and
    the amount of a $C_{13}$ branched fatty acid is less than 50% by mole based on the total amount of fatty acids.

2. A working fluid composition for refrigerating machines, consisting of:
    the refrigerating machine oil composition according to claim 1; and
    a refrigerant comprising a hydrofluoroolefin.

3. The working fluid composition for refrigerating machines according to claim 2, wherein the refrigerant comprising a hydrofluoroolefin is 1,3,3,3-tetrafluoropropene (HFO-1234ze) or a refrigerant mixture of 1,3,3,3-tetrafluoropropene (HFO-1234ze) and difluoromethane (HFC-32).

4. The refrigerating machine oil composition of claim 1, wherein the ester base oil of (b) further comprises at least one additional ester of a polyhydric alcohol, wherein said additional ester is different from said ester of pentaerythritol and at least two aliphatic monocarboxylic acids having 4 to 9 carbon atoms.

5. The refrigerating machine oil composition of claim 4, wherein the polyhydric alcohol of the additional ester is selected from the group consisting of pentaerythritol, neopentyl glycol, and dipentaerythritol.

6. The refrigerating machine oil composition of claim 1, wherein the amount of a $C_{13}$ branched fatty acid is less than 40% by mole.

7. The refrigerating machine oil composition of claim 1, wherein the amount of a $C_{13}$ branched fatty acid is less than 35% by mole.

* * * * *

UNITED STATES PATENT AND TRADEMARK OFFICE
CERTIFICATE OF CORRECTION

PATENT NO. : 10,266,788 B2
APPLICATION NO. : 15/315028
DATED : April 23, 2019
INVENTOR(S) : Satoshi Hiyoshi et al.

It is certified that error appears in the above-identified patent and that said Letters Patent is hereby corrected as shown below:

In the Specification

At Column 17, Lines 56-57, "RPC-01CML" should be -- RPC-01 CML --.

In the Claims

At Column 38, Line 31, "pentaerythritol, and" should be -- pentaerythritol, --.

At Column 38, Lines 37-38, "fatty acid is less than 50% by mole" should be -- fatty acid is at least 6% by mole and 35% or less by mole --.

At Column 38, Line 64, "mole." should be -- mole based on the total amount of fatty acids. --.

Signed and Sealed this
Thirtieth Day of July, 2019

Andrei Iancu
*Director of the United States Patent and Trademark Office*